(12) United States Patent
Kim et al.

(10) Patent No.: US 12,051,834 B2
(45) Date of Patent: Jul. 30, 2024

(54) DEVICE FOR DIAGNOSING VALVE FAILURE OF FUEL CELL SYSTEM

(71) Applicants: HYUNDAI MOTOR COMPANY, Seoul (KR); KIA CORPORATION, Seoul (KR)

(72) Inventors: Jong Gyun Kim, Yongin-si (KR); Seong Cheol Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 407 days.

(21) Appl. No.: 17/412,707

(22) Filed: Aug. 26, 2021

(65) Prior Publication Data

US 2022/0131167 A1 Apr. 28, 2022

(30) Foreign Application Priority Data

Oct. 26, 2020 (KR) ........................ 10-2020-0138850

(51) Int. Cl.
| | | |
|---|---|---|
| H01M 8/04 | (2016.01) | |
| G05B 19/05 | (2006.01) | |
| H01M 8/04089 | (2016.01) | |
| H01M 8/04223 | (2016.01) | |
| H01M 8/0438 | (2016.01) | |
| H01M 8/0444 | (2016.01) | |
| H01M 8/04537 | (2016.01) | |
| H01M 8/04664 | (2016.01) | |
| H01M 8/04992 | (2016.01) | |

(52) U.S. Cl.
CPC ........ *H01M 8/04679* (2013.01); *G05B 19/05* (2013.01); *H01M 8/04089* (2013.01); *H01M 8/04231* (2013.01); *H01M 8/04388* (2013.01); *H01M 8/04447* (2013.01); *H01M 8/04589* (2013.01); *H01M 8/04992* (2013.01)

(58) Field of Classification Search
None
See application file for complete search history.

(56) References Cited

U.S. PATENT DOCUMENTS

2020/0136158 A1* 4/2020 Park ................. H01M 8/04589

FOREIGN PATENT DOCUMENTS

KR 2017-0136738 A 12/2017

\* cited by examiner

*Primary Examiner* — Lucas J. O'Donnell
(74) *Attorney, Agent, or Firm* — MCDONNELL BOEHNEN HULBERT & BERGHOFF LLP

(57) ABSTRACT

A device for diagnosing a valve failure of a fuel cell system is capable of accurately and quickly determining whether an integrated valve in a fuel cell system is operated abnormally, and preventing problems caused by the operation abnormality of the integrated valve.

11 Claims, 5 Drawing Sheets

FIG. 3
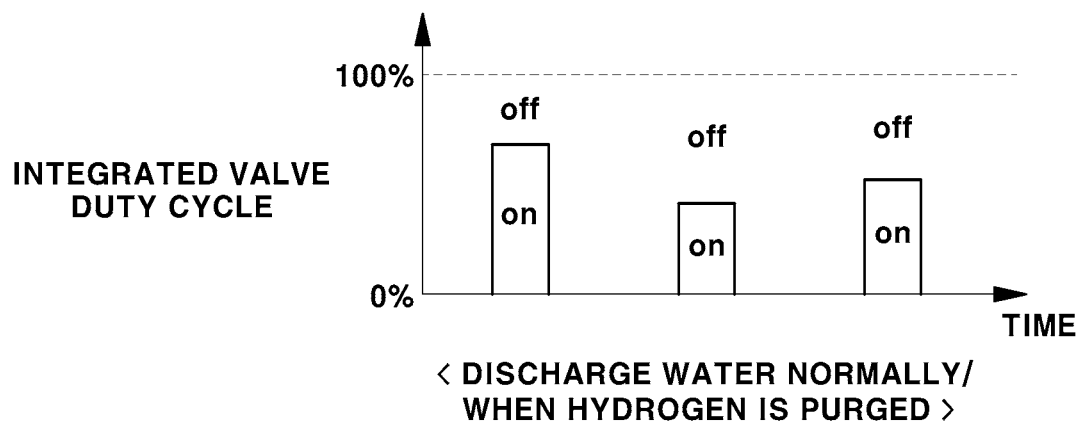
< DISCHARGE WATER NORMALLY/
WHEN HYDROGEN IS PURGED >
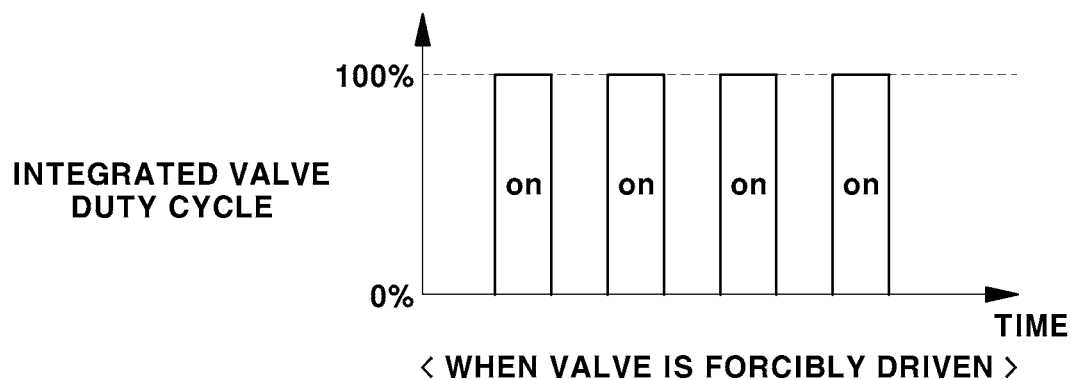
< WHEN VALVE IS FORCIBLY DRIVEN >

DEVICE FOR DIAGNOSING VALVE FAILURE OF FUEL CELL SYSTEM

CROSS REFERENCE TO RELATED APPLICATIONS

This application claims under 35 U.S.C. § 119(a) the benefit of priority to Korean Patent Application No. 10-2020-0138850 filed on Oct. 26, 2020, the entire contents of which are incorporated herein by reference.

BACKGROUND

(a) Technical Field

The present disclosure relates to a device for diagnosing a valve failure of a fuel cell system. More particularly, it relates to a device for diagnosing a valve failure of a fuel cell system, which is capable of determining whether a valve in a fuel cell system fails and preventing a problem caused by a failure of the valve.

(b) Background Art

Generally, a fuel cell stack is a power generation device which converts chemical energy of fuel into electrical energy by electrochemically reacting a fuel gas with an oxidant gas.

A fuel cell system mounted on a vehicle together with the fuel cell stack includes devices for supplying reaction gases to the fuel cell stack in addition to the fuel cell stack.

In addition, the fuel cell system recycles to use hydrogen which is unreacted in the fuel cell stack and, when an impurity ratio of the recycled hydrogen rises, the fuel cell system discharges the recycled hydrogen to an exhaust pipe. In addition, the fuel cell system stores water, which is generated due to the reaction of hydrogen and oxygen in the fuel cell stack, in a water trap and discharges the water to the exhaust pipe when a level of the water rises to a predetermined level. In this case, the water level of the water trap is detected using a water level sensor.

In the fuel cell system, an integrated valve having a water discharge function and a hydrogen purge function serves to open or block one passage to allow water, which is a reactant in the fuel cell stack, and recycled hydrogen to be discharged through the one passage.

A structure of the water trap is designed such that, when water and hydrogen coexist, the water is discharged first and, when the discharge of the water is complete, a discharge of the hydrogen is begun. Whether the water is discharged from the water trap is determined through the water level sensor.

When the integrated valve operates normally and thus the discharge of the hydrogen is completed, it may be estimated that an inner hydrogen concentration of the fuel cell stack is increased, or atmospheric pressure correction of a hydrogen pressure sensor may be performed.

Meanwhile, the water level sensor can detect only a variation in height of the water in the water trap.

Thus, when the integrated valve operates in an open mode, whether water is actually discharged from the water trap may be determined by a controller through a variation in signal value of the water level sensor.

In addition, when a hydrogen purge is performed in a situation in which only hydrogen, which cannot be measured by the water level sensor, is present in the water trap, the controller cannot determine whether hydrogen is actually purged.

Thus, when the integrated valve is not opened due to foreign materials, freezing, or a failure, or when the integrated valve is closed during the hydrogen purge, it is impossible to know whether the hydrogen purge is actually performed normally to be completed according to a purge command from the controller.

When the hydrogen concentration in the fuel cell stack is estimated, since a hydrogen purge amount is calculated using water-free information detected through the water level sensor and a hold time of an integrated valve open command, and an increase level of the hydrogen concentration in the fuel cell stack is estimated, even when the hydrogen purge is not actually performed, it is determined that the hydrogen concentration in the fuel cell stack is increased.

In this case, since the fuel cell stack is operated on the premise that the hydrogen concentration in the fuel cell stack is increased even though the hydrogen concentration in the fuel cell stack is not actually increased, degradation in output of the fuel cell stack or degradation in durability thereof due to a lack of hydrogen may occur.

In addition, when an atmospheric pressure correction of the hydrogen pressure sensor is performed, the correction of the hydrogen pressure sensor does not learn with an appropriate value in a situation in which the integrated valve is not actually operated so that the fuel cell stack is operated in a state of a hydrogen overpressure during normal driving, and thus fuel efficiency of hydrogen is degraded.

SUMMARY

The present disclosure has been made in an effort to solve the above-described problems associated with prior art.

In one aspect, the present disclosure provides a device for diagnosing a valve failure of a fuel cell system, which is capable of accurately and quickly determining whether an integrated valve in a fuel cell system is operated abnormally to prevent problems caused by the operation abnormality of the integrated valve.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a device for diagnosing a valve failure of a fuel cell system, which includes a water trap configured to store water and hydrogen which are discharged from a fuel cell stack, an integrated valve configured to open or close a passage through which the water and the hydrogen stored in the water trap are discharged, and a controller configured to enter the integrated valve into a forced driving mode when the controller commands an opening or closing operation of the integrated valve and determines that the integrated valve is not operated normally based on information on an instantaneous rate of change of a drive current for operating the integrated valve, and configured to determine that the integrated valve fails when the integrated valve is not operated normally even after the integrated valve is entered into the forced driving mode.

According to an embodiment of the present disclosure, when a water level of the water trap is zero, an opening operation of the integrated valve is commanded, and the integrated valve is not operated normally, the controller may not perform a hydrogen concentration estimation of the fuel cell stack and may not perform a zero value correction of a hydrogen pressure sensor configured to detect a pressure of hydrogen supplied to the fuel cell stack.

In addition, when the water level of the water trap is zero, an opening operation of the integrated valve is commanded, and the integrated valve is operated normally, the controller may perform the hydrogen concentration estimation of the fuel cell stack and the zero value correction of the hydrogen pressure sensor after a set time elapses.

In addition, when a water level of the water trap is not zero, an opening operation of the integrated valve is commanded, the integrated valve is operated normally and, simultaneously, a water level of the water trap is not decreased, the controller may determine that a discharge passage of the integrated valve is clogged after a set time elapses.

According to an embodiment of the present disclosure, when the closing operation of the integrated valve is commanded and the integrated valve is not operated normally, the controller may not perform a hydrogen concentration estimation of the fuel cell stack, and when the closing operation of the integrated valve is commanded and the integrated valve is operated normally, the controller may perform the hydrogen concentration estimation of the fuel cell stack after a set time elapses.

In addition, when the closing operation is commanded to the integrated valve and when it is determined that the integrated valve fails and, simultaneously, a pressure of the hydrogen supplied to the fuel cell stack is decreased, the controller may interrupt a supply of the hydrogen to the fuel cell stack.

In addition, when the closing operation is commanded to the integrated valve and when it is determined that the integrated valve fails and, simultaneously, a pressure of the hydrogen supplied to the fuel cell stack is not decreased, the controller may limit an output of the fuel cell stack to be less than or equal to a predetermined reference output.

According to an embodiment of the present disclosure, when the opening operation is commanded to the integrated valve and when the instantaneous rate of change of the drive current is changed from a positive (+) value to a negative (−) value and then changed from the negative (−) value to the positive (+) value again while the drive current of the integrated valve is increased, the controller may determine that the opening operation of the integrated valve is operated normally.

In addition, when the closing operation is commanded to the integrated valve and when the instantaneous rate of change of the drive current is changed from a negative (−) value to a positive (+) value and then changed from the positive (+) value to the negative (−) value again while the drive current of the integrated valve is decreased, the controller may determine that the closing operation of the integrated valve is operated normally.

In addition, when the integrated valve is entered into the forced driving mode, the controller may command an operation according to a set open duty cycle and the number of times of opening operations to the integrated valve.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 3 shows graphs illustrating duty cycles of the integrated valve according to the present disclosure;

Figure 1:
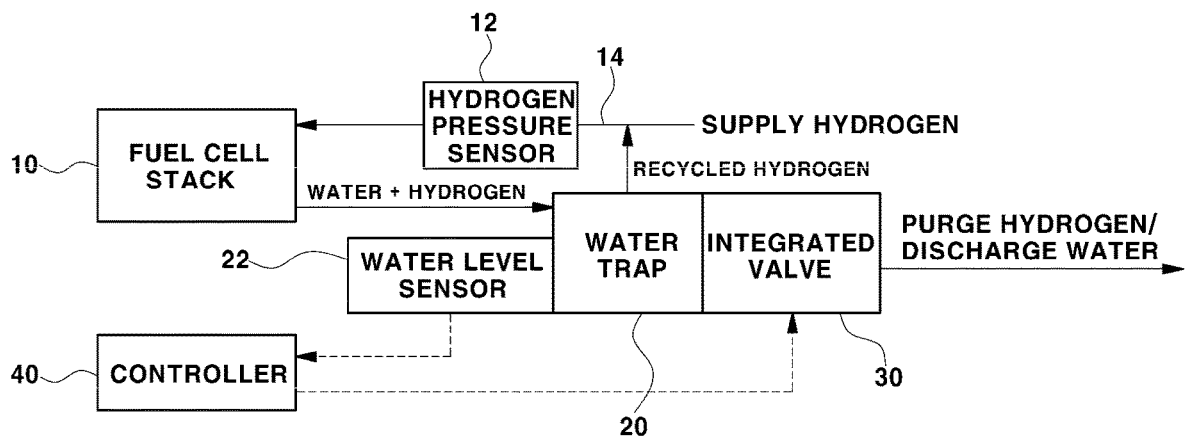
FIG. 1 is a diagram illustrating a configuration of a fuel cell system according to the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter exemplary embodiments of the present disclosure will be described in detail which is suitable for easy implementation by those skilled in the art with reference to the accompanying drawings. However, the present disclosure is not limited to the embodiments disclosed herein and may be implemented in other forms.

In addition, throughout this specification, when an element is referred to as "comprising" a component, it means that the component can further include other components, not excluding the other components unless specifically stated otherwise.

According to the present disclosure, whether an integrated valve is operated abnormally may be accurately and quickly determined, the operation abnormality of the integrated valve may be immediately responded, and thus problems caused by the operation abnormality of the integrated valve may be prevented.

In the present disclosure, without additionally installing a pressure sensor in a water trap, it is determined whether the integrated valve is operated normally by using an operating characteristic of the integrated valve.

According to the present disclosure, in a state in which a height of water stored in the water trap is zero (0%), when the integrated valve is opened to purge only hydrogen stored in the water trap to an exhaust pipe of a fuel cell system, it is possible to prevent a hydrogen purge failure and an excessive hydrogen purge due to a malfunction of the integrated valve.

In addition, according to the present disclosure, in a state in which the integrated valve is opened, when an atmospheric pressure correction of a hydrogen pressure sensor installed in a hydrogen supply line of a fuel cell stack is performed, it is possible to prevent a learning failure of a correction value of the hydrogen pressure sensor, which may occur due to the malfunction of the integrated valve.

FIG. 1 is a diagram illustrating a configuration of a fuel cell system according to an embodiment of the present disclosure.

As shown in FIG. 1, the fuel cell system may include a fuel cell stack 10, a water trap 20, an integrated valve 30, a water level sensor 22, a hydrogen pressure sensor 12, and a controller 40.

Here, a configuration mainly related to abnormality diagnosis and corresponding control of the integrated valve 30 will be described, but the fuel cell system may include a configuration of a general fuel cell system in addition to the above configuration.

For example, the fuel cell system may include a hydrogen supply device for supplying hydrogen to the fuel cell stack 10 and an air supply device for supplying air to the fuel cell stack 10.

The fuel cell stack 10 is a power generation device which converts chemical energy of fuel into electrical energy by electrochemically reacting a fuel gas with an oxidant gas.

When hydrogen, which is a fuel gas, and oxygen in the air, which is an oxidant gas, chemically react with each other to generate electrical energy, the fuel cell stack 10 generates water due to the reaction of the hydrogen and the oxygen.

The water generated in the fuel cell stack 10 falls due to gravity and is collected in the water trap 20 disposed below the fuel cell stack 10. When the water generated in the fuel cell stack 10 is discharged to the water trap 20, some hydrogen in the fuel cell stack 10 is discharged to the water trap 20 together with the water.

The water trap 20 stores the water and the hydrogen which are discharged from the fuel cell stack 10 and, when a height of the water stored in the water trap 20 exceeds a predetermined water level, the water trap 20 discharges the water to the outside of the fuel cell system and, when the discharge of the water is completed, the water trap 20 may begin to discharge the hydrogen.

To this end, the water level sensor 22 is configured to detect the height of the water stored in the water trap 20, and the integrated valve 30 is configured to open or close a passage of the water trap 20 for discharging water and hydrogen.

Hydrogen, which is unreacted in the fuel cell stack 10 to be collected in the water trap 20, is recycled to the fuel cell stack 10 and used. That is, the hydrogen recycled to the fuel cell stack 10 (i.e., the recycled hydrogen) is recovered to the fuel cell stack 10 via the water trap 20.

However, when an impurity ratio of the recycled hydrogen is high, the hydrogen collected in the water trap 20 is not recycled to the fuel cell stack 10 and is discharged to the outside of the fuel cell system together with water.

The discharge of the hydrogen collected in the water trap 20 to the outside of the fuel cell system is referred to as a "hydrogen purge."

The integrated valve 30 is configured to open or close a passage for discharging the water or the hydrogen stored in the water trap 20 to the exhaust pipe of the fuel cell system. That is, the integrated valve 30 is configured to open or close the passage of the water trap 20 connected to the exhaust pipe of the fuel cell system. In other words, the integrated valve 30 may be operated to open or close the passage through which the water and the hydrogen stored in the water trap 20 are discharged.

The integrated valve 30 may be a solenoid valve which is operated when a drive current is applied. Specifically, the integrated valve 30 may be a valve in which an inner passage of the integrated valve 30 is opened due to movement of a plunger to an open position when a drive current for an opening or closing operation is applied to a coil.

The integrated valve 30 may include an inlet for introducing water and hydrogen and an outlet for discharging the water and the hydrogen, and the inner passage of the integrated valve 30 may be formed between the inlet and the outlet. The water and the hydrogen stored in the water trap 20 may be discharged to the exhaust pipe of the fuel cell system through the inner passage of the integrated valve 30.

The hydrogen pressure sensor 12 is installed on a hydrogen supply line 14 of the fuel cell stack 10 and configured to measure a pressure of hydrogen supplied to the fuel cell stack 10.

The controller 40 is configured to control an opening operation and a closing operation of the integrated valve 30. Specifically, the controller 40 determines whether an operation of the integrated valve 30 is required and operates the integrated valve 30 in an open mode or a close mode, as necessary.

The controller 40 determines a water level of the water trap 20 using a signal from the water level sensor 22 and detects a variation in water level of the water trap 20.

The controller 40 may determine whether a discharge of the water from the water trap 20 is completed through the signal from the water level sensor 22. That is, whether the water is actually discharged from the water trap 20 is determined by the controller 40 based on the signal from the water level sensor 22.

When it is determined that an impurity ratio of the hydrogen recycled from the water trap 20 to the fuel cell stack 10 is high, the controller 40 opens the integrated valve 30 to purge the hydrogen to the exhaust pipe of the fuel cell system.

The controller 40 may calculate an amount of the hydrogen purged (i.e., the hydrogen purge amount) to the exhaust pipe of the fuel cell system when the integrated valve 30 is opened on the basis of a time in which an open command of the integrated valve 30 is held from a time point at which the discharge of the water of the water trap 20 is completed.

When it is determined that the integrated valve 30 is operated normally to be opened and thus the hydrogen purge of the water trap 20 is completed, the controller 40 may estimate that the hydrogen having a high impurity ratio is discharged from the fuel cell stack 10 so that an inner hydrogen concentration of the fuel cell stack 10 is increased before the hydrogen purge of the water trap 20 is performed.

When the hydrogen in the water trap 20 is recovered to the fuel cell stack 10, the controller 40 may estimate the inner hydrogen concentration of the fuel cell stack 10 on the basis of an amount of hydrogen supplied to the fuel cell stack 10 from a hydrogen supply device (not shown) and an amount of the recycled hydrogen supplied to the fuel cell stack 10 from the water trap 20. In addition, when the hydrogen in the water trap 20 is purged to the exhaust pipe of the fuel cell system, the controller 40 may estimate a hydrogen concentration of the fuel cell stack 10 based on the amount of the hydrogen supplied to the fuel cell stack 10 from the hydrogen supply device and a hydrogen purge amount discharged from the water trap 20.

In addition, when the hydrogen purge of the water trap 20 is completed, the integrated valve 30 is opened to communicate with the atmosphere so that the controller 40 may perform a zero value correction on the hydrogen pressure sensor 12 installed in the hydrogen supply line 14.

In a situation in which the supply of the hydrogen to the fuel cell stack 10 is interrupted, the controller 40 may open the integrated valve 30 at regular periods to expose the hydrogen pressure sensor 12 to the atmosphere, thereby correcting a zero value of the hydrogen pressure sensor 12. The zero value correction of the hydrogen pressure sensor 12 may be performed such that the integrated valve 30 is opened and thus the hydrogen pressure sensor 12 communicates with the atmosphere.

When the integrated valve 30 is opened for the hydrogen purge of the water trap 20, the hydrogen pressure sensor 12 communicates with the atmosphere to detect an atmospheric pressure so the controller 40 learns a corrected value of the hydrogen pressure sensor 12 (i.e., the atmospheric pressure) when the hydrogen purge of the water trap 20 is completed.

In other words, when the integrated valve 30 is operated normally to be opened, the controller 40 sets the pressure value (i.e., the atmospheric pressure) measured by the hydrogen pressure sensor 12 as a zero value of the hydrogen pressure sensor 12.

In addition, when the controller 40 commands the operation of the integrated valve 30, the controller 40 may determine whether opening and closing operations of the integrated valve 30 are performed normally based on information on the drive current for the opening operation of the integrated valve 30.

When the drive current is supplied, the integrated valve 30 performs the opening operation, and when a supply of the drive current is interrupted, the integrated valve 30 performs the closing operation.

Figure 2:
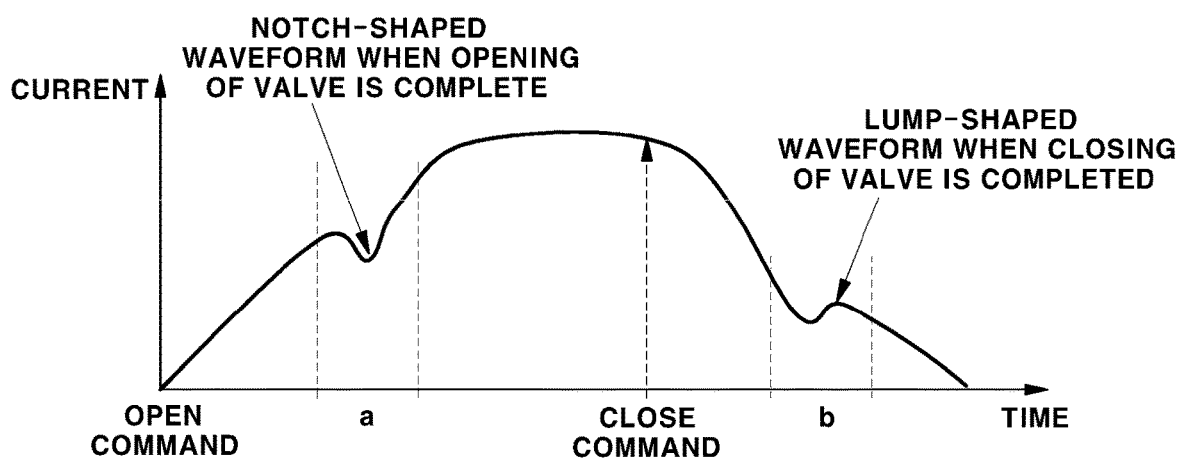
FIG. 2 is a graph showing an example of a drive current waveform of an integrated valve according to the present disclosure.

As shown in FIG. 2, when the controller 40 instructs an open command to the integrated valve 30, the drive current applied to the integrated valve 30 is increased over time, and when the opening operation of the integrated valve 30 is completed, a notch-shaped current waveform is generated.

In addition, as shown in FIG. 2, when the controller 40 instructs a close command to the integrated valve 30, the drive current applied to the integrated valve 30 is decreased over time, and when the closing operation of the integrated valve 30 is completed, a lump-shaped current waveform is generated.

The controller 40 may calculate an instantaneous rate of change (a slope) of the drive current over time to detect a variation in waveform of the drive current. In this case, the instantaneous rate of change of the drive current may be obtained by calculating a differential value of a function representing changes of the drive current over time.

While the drive current is increased for the opening operation of the integrated valve 30, when the instantaneous rate of change of the drive current is changed from a positive (+) value to a negative (−) value and then changed from the negative (−) value to the positive (+) value again, the controller 40 determines that the opening operation of the integrated valve 30 is operated normally and then completed.

In addition, while the drive current is decreased for the closing operation of the integrated valve 30, when the instantaneous rate of change of the drive current is changed from the negative value to the positive value and then changed from the positive value to the negative value again, the controller 40 determines that the closing operation of the integrated valve 30 is operated normally and then completed.

As described above, when the controller 40 commands the opening operation or the closing operation of the integrated valve 30, the controller 40 may determine whether the integrated valve 30 is operated normally based on the information on the instantaneous rate of change of the drive current.

In addition, when the controller 40 determines that the operation of the integrated valve 30 is not performed based on the information on the instantaneous rate of change of the drive current, that is, when the malfunction of the integrated valve 30 is diagnosed based on the information on the instantaneous rate of change of the drive current, in order to more accurately determine whether the integrated valve 30 fails, the controller 40 enters the integrated valve 30 into a forced driving mode.

When the integrated valve 30 is entered the forced driving mode, the controller 40 transmits an operation command according to a set open duty cycle and the number of times of opening operations to the integrated valve 30. The open duty cycle may be an opening operation time of the integrated valve 30. The integrated valve 30 forcibly repeats the opening and closing operations according to the number of times of the opening operations.

In other words, in order to re-determine whether the integrated valve 30 fails, the controller 40 enters the integrated valve 30 into the forced driving mode in which the open duty cycle and the number of times of the opening operations of the integrated valve 30 are set.

When the integrated valve 30 is entered into the forced driving mode, the integrated valve 30 receives an operation command from the controller 40 according to a set open duty cycle and the number of times of the opening operations regardless of a real-time water level and a hydrogen amount in the water trap 20.

For example, in the forced driving mode, the open duty cycle of the integrated valve 30 may be set to 100%, and the number of times of the opening operations of the integrated valve 30 may be set to four.

The open duty cycle of the integrated valve 30 may be a ratio to a predetermined reference operating time. For example, when the reference operating time of the integrated valve 30 is one second and the open duty cycle of the integrated valve 30 is 100%, the integrated valve 30 is opened for one second when operated once.

In addition, when the forced driving mode is executed, the integrated valve 30 is periodically operated as many times as a set number of times of the opening operations.

When the forced driving mode is executed, the open duty cycle of the integrated valve 30 may be increased and an opening operation interval thereof may be reduced when compared with a general driving mode.

Here, the general driving mode is an operating control mode of the integrated valve 30 for discharging water or hydrogen from the water trap 20. In the case of the general driving mode, the open duty cycle of the integrated valve 30 is controlled to less than 100%, and the integrated valve 30 is open-controlled when a discharge of the water or the hydrogen of the water trap 20 is necessary.

As described above, when the controller 40 determines operation abnormality of the integrated valve 30 based on the information on the instantaneous rate of change of the drive current, the controller 40 enters the integrated valve 30 into the forced driving mode and diagnoses the operation abnormality of the integrated valve 30 according to whether the integrated valve 30 entered into the forced driving mode is operated abnormally.

When the controller 40 determines the operation abnormality of the integrated valve 30 entered into the forced driving mode, the controller 40 confirms occurrence of a failure of the integrated valve 30.

In addition, when the controller 40 commands the opening operation of the integrated valve 30 and determines that the opening operation of the integrated valve 30 is not performed based on the information on the instantaneous rate of change of the drive current, the controller 40 immediately cancels an estimation of the inner hydrogen concentration of the fuel cell stack 10 not to perform the estimation.

When the integrated valve 30 is operated normally to be opened according to the command, the discharge of the hydrogen of the water trap 20 is completed, and the opening operation of the integrated valve 30 is terminated, that is, when the operation mode of the integrated valve 30 is switched normally from the open mode to a close mode, the controller 40 performs a hydrogen concentration estimation operation which is scheduled at an end time point of the opening operation of the integrated valve 30.

The controller 40 may include a hydrogen concentration estimation part for estimating the inner hydrogen concentration of the fuel cell stack 10. When the hydrogen concentration estimation operation is canceled, the hydrogen concentration estimation part is not operated.

In addition, when the controller 40 commands the opening operation of the integrated valve 30 and determines that the opening operation of the integrated valve 30 is not performed on the basis of the information on the instantaneous rate of change of the drive current, the controller 40 cancels learning of a corrected value of the hydrogen pressure sensor 12, which is scheduled at an end time point of the opening operation of the integrated valve 30, not to perform the learning.

When the integrated valve 30 is operated normally to be opened and the hydrogen pressure sensor 12 is exposed to atmospheric pressure according to the opening operation of the integrated valve 30, the controller 40 sets a signal value obtained from the hydrogen pressure sensor 12 as a zero value of the hydrogen pressure sensor 12.

When the water level of the water trap 20 is zero (0%) and the integrated valve 30 is operated normally to be opened, the controller 40 may determine that the discharge of the hydrogen of the water trap 20 is performed normally.

Thus, when the water level of the water trap 20 is zero (0%) and the integrated valve 30 is operated normally to be opened according to the command, after a set time elapses, the controller 40 performs the learning of the corrected value of the hydrogen pressure sensor 12 and performs the estimation of the inner hydrogen concentration in the fuel cell stack 10.

When the water level of the water trap 20 is zero (0%) and the controller 40 diagnoses an operation abnormality of the integrated valve 30, the controller 40 cancels the zero value correction of the hydrogen pressure sensor 12 so that it is possible to prevent a failure of the zero value correction of the hydrogen pressure sensor 12 and degradation of hydrogen fuel efficiency due to the failure.

In addition, when the water level of the water trap 20 is zero (0%) and the controller 40 diagnoses an operation abnormality of the integrated valve 30, the controller 40 cancels performing of a hydrogen concentration estimation of the fuel cell stack 10 to prevent a hydrogen concentration estimation error.

When an error occurs while the inner hydrogen concentration of the fuel cell stack 10 is estimated, since an inner hydrogen pressure of the fuel cell stack 10 becomes in an overpressure state during normal driving, hydrogen fuel efficiency may be degraded.

When the water level of the water trap 20 is not zero, the controller 40 determines that the integrated valve 30 is being operated in the open mode. However, even after a set time elapses, when the water level of the water trap 20 is not actually decreased, the controller 40 determines that a failure occurs due to clogging of a discharge passage of the integrated valve 30.

In other words, the controller 40 determines that the integrated valve 30 is operated in the open mode according to the command. However, when the water level of the water trap 20 is not reduced even though the water level of the water trap 20 is not zero, the controller 40 determines that the failure occurs due to the clogging of the discharge passage of the integrated valve 30. When the discharge passage of the integrated valve 30 is clogged, even when the integrated valve 30 is operated to be opened, the discharge of the water of the water trap 20 is not performed.

When the controller 40 commands a closing operation of the integrated valve 30 and determines that the closing operation of the integrated valve 30 is operated normally based on the information on the instantaneous rate of change of the drive current, the controller 40 calculates a hydrogen purge amount on the basis of a time in which an open command of the integrated valve 30 is held (i.e., an open command hold time) and estimates the inner hydrogen concentration of the fuel cell stack 10 using the hydrogen purge amount.

Immediately before the controller 40 commands the closing operation to the integrated valve 30, the controller 40 calculates the hydrogen purge amount based on a time in which the open command of the integrated valve 30 is held from a time point at which the discharge of the water of the water trap 20 is completed.

In addition, when the controller 40 commands the closing operation of the integrated valve 30 and determines that the closing operation of the integrated valve 30 is not performed based on the information on the instantaneous rate of change of the drive current, the controller 40 cancels the estimation of the inner hydrogen concentration of the fuel cell stack 10 and enters the integrated valve 30 into the forced driving mode.

When the controller 40 commands the closing operation to the integrated valve 30 and, even after the integrated valve 30 is entered into the forced driving mode, the integrated valve 30 is not operated in the close mode, the controller 40 determines a failure of the integrated valve 30.

When the controller 40 determines that the integrated valve 30 fails, the controller 40 measures a pressure of the hydrogen supplied to the fuel cell stack 10 through the hydrogen pressure sensor 12 and, subsequently, when it is determined that the pressure of the hydrogen supplied to the fuel cell stack 10 is decreased over time, the controller 40 interrupts the supply of the hydrogen to the fuel cell stack 10. The controller 40 interrupts the supply of the hydrogen to the fuel cell stack 10 so that it is possible to prevent the hydrogen from excessively leaking into the atmosphere from the hydrogen supply line 14 and secure safety of vehicle occupants.

When the controller 40 confirms the failure of the integrated valve 30 and determines that the pressure of the hydrogen supplied to the fuel cell stack 10 is not decreased, the controller 40 limits an output of the fuel cell stack 10 to operates the fuel cell stack 10.

In a situation in which the failure of the integrated valve 30 is confirmed, when it is determined that a pressure drop of the hydrogen supplied to the fuel cell stack 10 does not occur, the controller 40 determines that there is no leakage of the hydrogen into the air or that the leakage of the hydrogen into the air is insignificant. In addition, since it is difficult to secure full performance of the fuel cell stack 10 due to the inner hydrogen concentration estimation of the fuel cell stack 10 being not performed, the controller 40 controls of the operation of the fuel cell stack 10 in a state of limiting the output of the fuel cell stack 10. In this case, the output of the fuel cell stack 10 may be limited to less than or equal to a predetermined reference output.

Hereinafter, a method of determining whether the integrated valve 30 fails when the opening operation is commanded to the integrated valve 30 and a response method during diagnosis of a failure of the integrated valve 30 will be described with reference to FIG. 4.

Here, a process of determining a failure of the integrated valve 30 and a process of responding the failure are sequentially described with reference to FIG. 4, but the present disclosure is not limited by the order of the processes.

Figure 4:
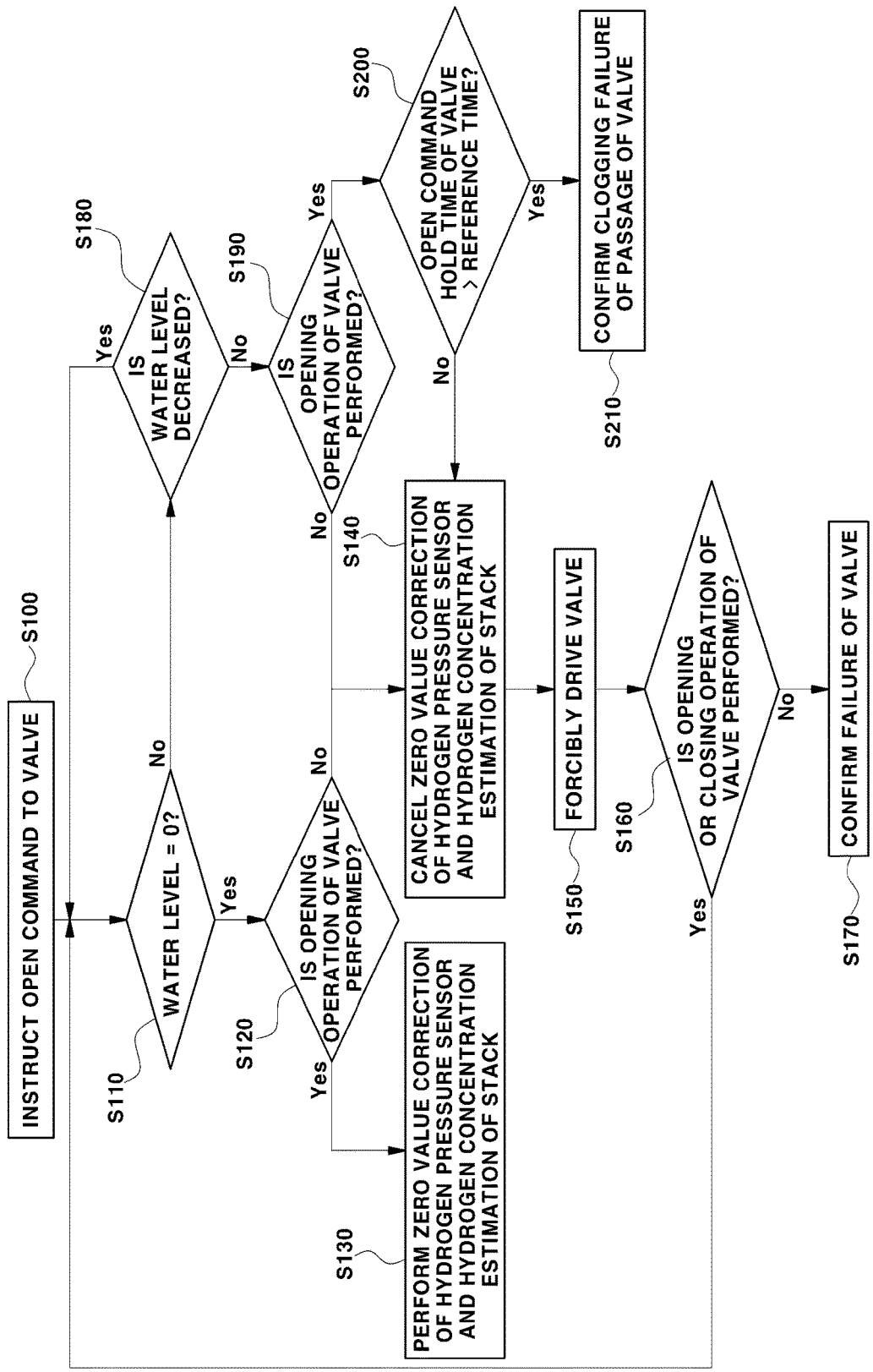
FIG. 4 is a flowchart illustrating a method of diagnosing a failure upon an open command of the integrated valve according to the present disclosure.

Referring to FIG. 4, the controller 40 instructs an open command to the integrated valve 30 at S100 and determines a water level of the water trap 20 based on a signal of the water level sensor 22. The water level of the water trap 20 may be calculated in the range of 0% to 100% based on a height from a bottom surface of an inner side to a top surface of the inner side of the water trap 20.

Next, whether the water level of the water trap 20 is 0% is determined at S110. When the water level of the water trap 20 is 0%, it is determined whether the integrated valve 30 is operated to be opened based on information on an instantaneous rate of change of a valve drive current at S120. The valve drive current is a drive current which is applied to a coil of the integrated valve 30 so as to operate the integrated valve 30.

When it is determined that the integrated valve 30 is operated to be opened, a zero value correction of the hydrogen pressure sensor 12 and a hydrogen concentration estimation of the fuel cell stack 10 are performed at S130. In the hydrogen pressure sensor 12 exposed to the atmosphere in a state in which the integrated valve 30 is opened, an atmospheric pressure is corrected to a zero value.

In addition, when it is determined that the integrated valve 30 is not operated to be opened based on the information on the instantaneous rate of change, that is, when it is determined that the opening operation of the integrated valve 30 fails, the inner hydrogen concentration estimation of the fuel cell stack 10 and the zero value correction of the hydrogen pressure sensor 12 are immediately canceled at S140, and the integrated valve 30 is entered into the forced driving mode at S150.

Whether the integrated valve 30, which is entered into the forced driving mode, is operated to be opened or closed is determined based on the information on the instantaneous rate of change of the valve drive current at S160. When the opening and closing operations of the integrated valve 30 are not performed normally, it is confirmed that a failure of the integrated valve 30 occurs at S170.

In addition, when the instantaneous rate of change of the valve drive current is changed from a positive (+) value to a negative (−) value and then changed from the negative (−) value to the positive (+) value again, it is determined that the integrated valve 30 is restored to a normal operating mode to be operated normally.

Meanwhile, when it is determined that the water level of the water trap 20 is not 0% in S110, whether a decrease in the water level of the water trap 20 occurs is determined at S180.

When the decrease in the water level of the water trap 20 occurs, the process returns to S110 and the water level of the water trap 20 is determined again.

When the decrease in the water level of the water trap 20 does not occur, the information on the instantaneous rate of change of the valve drive current is acquired, and it is determined whether the integrated valve 30 is operated to be opened based on the information on the instantaneous rate of change of the valve drive current at S190.

When it is determined that the integrated valve 30 is being operated to be opened, a time in which an open command of the integrated valve 30 is held (i.e., an open command hold time) is measured, and the open command hold time is compared with a predetermined reference time at S200. When the open command hold time elapses the reference time, the integrated valve 30 is actually operated to be opened, but the water level of the water trap 20 is not decreased so that it is confirmed that a failure of the integrated valve 30 occurs due to clogging of the discharge passage of the integrated valve 30 at S210.

When it is determined that the integrated valve 30 is not in the opening state, the inner hydrogen concentration estimation of the fuel cell stack 10 and the zero value correction of the hydrogen pressure sensor 12 are immediately canceled at S140, and the integrated valve 30 is entered into the forced driving mode at S150.

Whether the integrated valve 30 entered into the forced driving mode is operated to be opened or closed is re-determined based on the information on the instantaneous rate of change of the valve drive current at S160. When it is determined that the opening and closing operations of the integrated valve 30 is not performed based on the information on the instantaneous rate of change of the valve drive current, the occurrence of the failure of the integrated valve 30 is confirmed at S170.

In addition, when the instantaneous rate of change of the valve drive current is changed from a positive (+) value to a negative (−) value and then changed from the negative (−) value to the positive (+) value again, it is determined that the integrated valve 30 is restored to the normal operating mode to be operated normally.

As described above, whether the operation of the integrated valve 30 fails is re-determined through the forced driving mode so that it is possible to improve reliability of diagnosis of the failure of the integrated valve 30.

When a failure of the operation occurs due to a temporary stuck state of the integrated valve 30, an electromagnetic force is induced to a valve coil and thus an external force is applied to the integrated valve 30 so that the temporary stuck state of the integrated valve 30 may be solved. Specifically, when a stuck of the integrated valve 30 occurs due to moisture freezing, a temperature of the coil is increased due to a current applied to the coil (i.e., the valve drive current) and thus an effect of heating a periphery of the coil occurs so that the stuck of the integrated valve 30 due to moisture freezing may be solved.

Hereinafter, a method of determining whether the integrated valve 30 fails when the closing operation is commanded to the integrated valve 30 and a response method during diagnosis of a failure of the integrated valve 30 will be described with reference to FIG. 5.

Here, a process of determining a failure of the integrated valve 30 and a process of responding the failure are sequentially described with reference to FIG. 5, but the present disclosure is not limited by the order of the processes.

Figure 5:
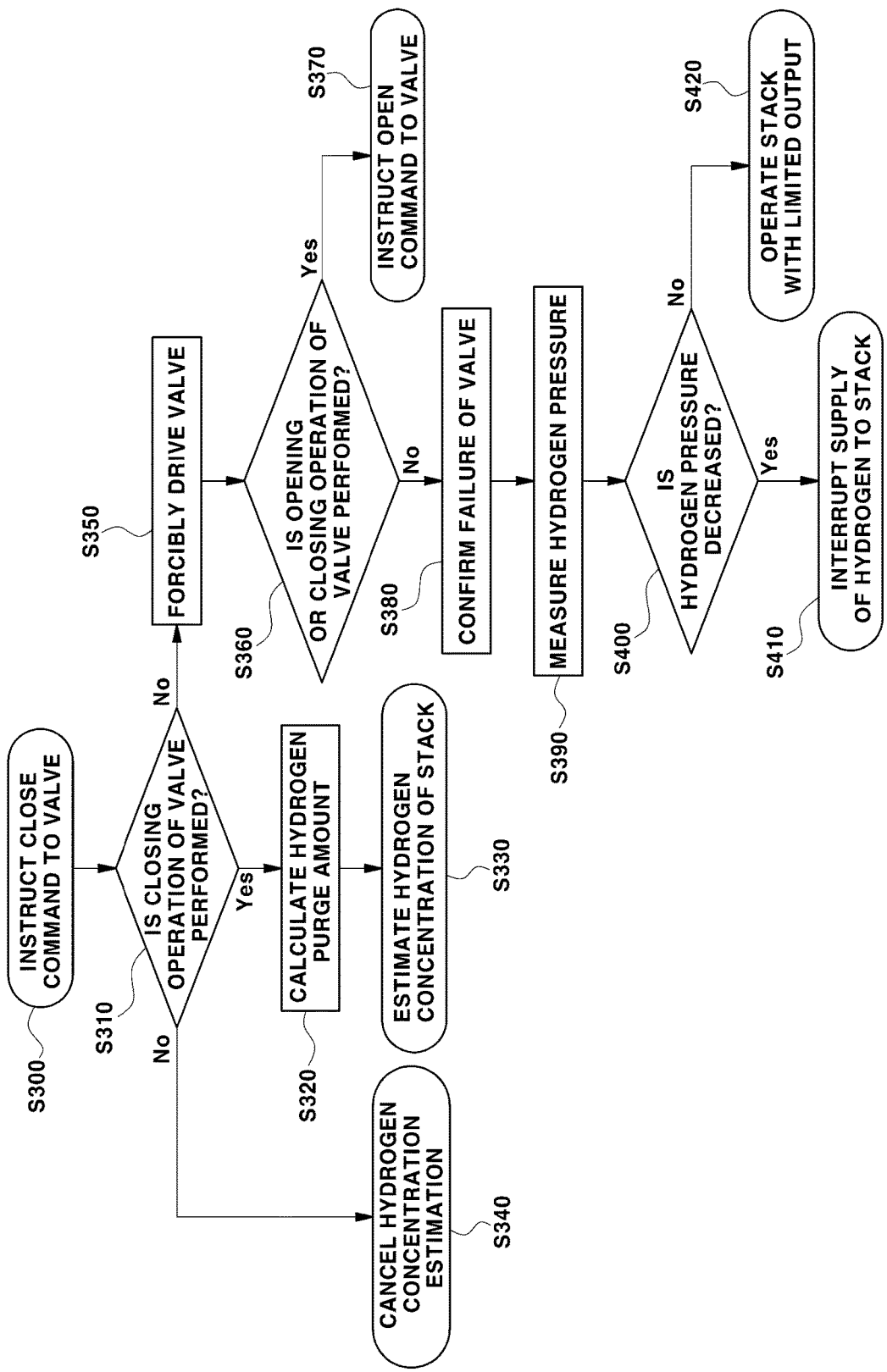
FIG. 5 is a flowchart illustrating a method of diagnosing a failure upon a close command of the integrated valve according to the present disclosure.

Referring to FIG. 5, when the controller 40 instructs a close command to the integrated valve 30 at S300, the information on the instantaneous rate of change of the valve drive current is acquired, and it is determined whether the integrated valve 30 is operated to be closed based on the information on the instantaneous rate of change of the valve drive current at S310.

As the determination result in S310, when it is determined that the integrated valve 30 is actually operated to be closed, an amount of the hydrogen discharged from the water trap 20 (i.e., a hydrogen purge amount) is calculated at S320 and the inner hydrogen concentration of the fuel cell stack 10 is estimated at S330. The hydrogen purge amount may be calculated based on the time in which the open command of the integrated valve 30 is held.

As the determination result in S310, when it is determined that a failure of the closing operation of the integrated valve 30 occurs, the hydrogen concentration estimation of the fuel cell stack 10 is immediately canceled at S340 and the integrated valve 30 is entered into the forced driving mode at S350.

Subsequently, it is determined whether the integrated valve 30 entered into the forced driving mode is operated to be opened or closed at S360. Whether the integrated valve 30 is operated to be opened or closed is determined based on the information on the instantaneous rate of change of the valve drive current.

When the opening or closing operation of the integrated valve 30 according to the forced driving mode is performed, the open command is instructed to the integrated valve 30 (S370). In addition, when the opening or closing operation of the integrated valve 30 according to the forced driving mode is not performed, it is finally determined that the integrated valve 30 fails at S380.

When the operation of the integrated valve 30 according to the forced driving mode is not performed normally, that is, when the failure of the integrated valve 30 is confirmed, the pressure of the hydrogen supplied to the fuel cell stack 10 is measured at S390 and it is determined whether the pressure of the hydrogen supplied to the fuel cell stack 10 is decreased at S400. In a situation in which the amount of hydrogen in the fuel cell stack 10 is not varied, when it is determined that the pressure of the hydrogen supplied to the fuel cell stack 10 is decreased, the supply of the hydrogen to the fuel cell stack 10 is interrupted at S410.

In a situation in which the failure due to the closing failure of the integrated valve 30 is confirmed, when the pressure of the hydrogen supplied to the fuel cell stack 10 is decreased, the supply of the hydrogen to the fuel cell stack 10 is immediately interrupted to prevent leakage of excessive hydrogen into the atmosphere so that safety of passengers is secured.

When a decrease in pressure of the hydrogen supplied to the fuel cell stack 10 is not detected, it is determined that the failure due to the closing failure of the integrated valve 30 is determined but the amount of the hydrogen leaking through the integrated valve 30 is insignificant, and since the hydrogen concentration estimation of the fuel cell stack 10 is canceled, it is difficult to ensure full performance of the fuel cell stack 10, and thus an output of the fuel cell stack 10 is limited at S420.

Hereinafter, a process of determining an operation failure of the integrated valve 30 using the valve drive current will be described with reference to FIG. 6.

Figure 6:
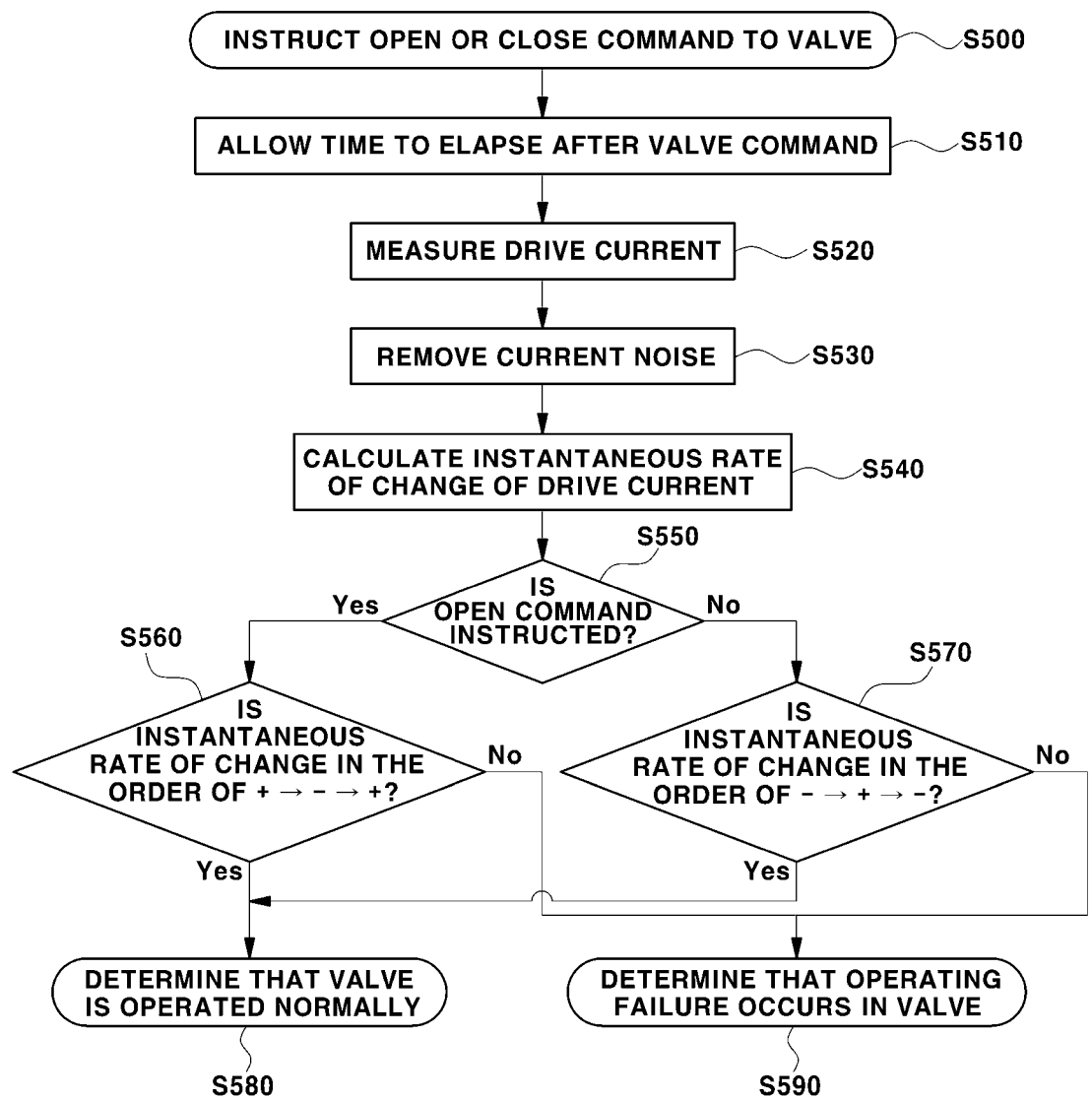
FIG. 6 is a flowchart illustrating a process of determining an operating state of the integrated valve according to the present disclosure.

As shown in FIG. 6, when the opening operation or the closing operation is commanded to the integrated valve 30 at S500 and a predetermined time elapses at S510, the valve drive current is periodically measured at S520 and the instantaneous rate of change of the valve drive current is calculated at S540. The instantaneous rate of change of the valve drive current may be calculated in a manner of calculating a differential coefficient. Before the calculating of the instantaneous rate of change, noise of the valve drive current may be removed to filter current data at S530.

Next, it is determined whether the operation command instructed to the integrated valve 30 is the open command at S550, and it is determined whether a sign of the instantaneous rate of change of the valve drive current is varied over time according to predetermination at S560 and S570.

When it is determined that the sign of the instantaneous rate of change of the valve drive current is varied to an opposite sign over time and then returned to the original sign, it is determined that the integrated valve 30 is operated normally, and in other cases, it is determined that a failure of the integrated valve 30 occurs due to an operation failure.

Referring to FIG. 2, when the open command is instructed to the integrated valve 30, the valve drive current is increased. When the instantaneous rate of change of the valve drive current measured after the open command is instructed to the integrated valve 30 is changed from a positive (+) value to a negative (−) value and then changed from the negative (−) value to the positive (+) value again, it is determined that the integrated valve 30 is operated normally at S580. In addition, when a condition in which the instantaneous rate of change of the valve drive current is changed from the positive (+) value to the negative (−) value and then changed from the negative (−) value to the positive (+) value again is not satisfied, it is determined that the failure due to the opening failure occurs in the integrated valve 30 at S590.

In addition, when the integrated valve 30 receives the close command, the valve drive current is decreased. When the instantaneous rate of change of the valve drive current measured after the integrated valve 30 receives the close command is changed from a negative value to a positive value and then changed from the positive value to the negative value again, it is determined that the integrated valve 30 is operated normally at S580. In addition, when a condition in which the instantaneous rate of change of the valve drive current is changed from the negative value to the positive value and then changed from the positive value to the negative value again is not satisfied, it is determined that the failure due to the closing failure occurs in the integrated valve 30 at S590.

When the integrated valve 30 is actually operated to be opened or closed and the plunger of the integrated valve 30 reaches a predetermined position in the integrated valve 30 to be stopped, a counter electromotive force is generated in the coil operating the plunger. Thus, as can be seen in Section a and Section b of the graph shown in FIG. 2, a predetermined-shaped current waveform is generated.

Specifically, when the integrated valve 30 receives the open command, the opening operation of the integrated valve 30 is completed so that the notch-shaped current waveform is generated as shown in Section a of FIG. 2. Thus, as described above, it may be determined whether the integrated valve 30 is operated to be opened based on the information on the instantaneous rate of change of the valve drive current.

In addition, when the integrated valve 30 receives the close command, the closing operation of the integrated valve 30 is completed so that the lump-shaped current waveform is generated as shown in Section b of FIG. 2. Thus, as described above, it may be determined whether the integrated valve 30 is operated to be closed based on the information on the instantaneous rate of change of the valve drive current.

When the valve drive current is applied to the integrated valve 30, but the integrated valve 30 is not operated normally and a stuck failure occurs, a waveform of the valve drive current, such as the waveform in Section a or Section b of FIG. 2, is not generated.

As described above, whether the integrated valve 30 is operated normally is determined using a characteristic of the waveform of the valve drive current so that, in a situation in which the water level of the water trap 20 is 0%, whether the hydrogen purged is performed normally may be determined without additionally installing a separate pressure sensor in the water trap 20.

In accordance with a device for diagnosing a valve failure of a fuel cell system according to the present disclosure, whether an integrated valve is operated normally can be determined using an operating characteristic of the integrated valve and, accordingly, whether an operation of the integrated valve is abnormal can be accurately determined without additionally installing a pressure sensor in a water trap, and it is possible to prevent a problem due to operation abnormality of the integrated valve by immediately responding to the operation abnormality of the integrated valve.

Although the present disclosure has been described in detail, the terms or words used in the specification and the appended claims should not be construed as being limited to ordinary or dictionary meanings, and the embodiments described herein and the configurations shown in the accompanying drawings are only exemplary embodiments of the present disclosure so that the scope of the present disclosure is not limited to these embodiments, and various modifications and improvements devised by those skilled in the art using the fundamental concept of the present disclosure, which is defined by the appended claims, further fall within the scope of the present disclosure.

The invention claimed is:

1. A device for diagnosing a valve failure of a fuel cell system, the device comprising:
    a water trap configured to store water and hydrogen discharged from a fuel cell stack;
    an integrated valve configured to open or close a passage through which the water and the hydrogen stored in the water trap are discharged; and
    a controller configured to enter the integrated valve into a forced driving mode when the controller commands an opening operation of the integrated valve and determines that the integrated valve is not open based on an instantaneous rate of change of a drive current for operating the integrated valve, and further configured to determine that the integrated valve fails when the integrated valve is not open after the integrated valve is entered into the forced driving mode.

2. The device of claim 1, wherein, when a water level of the water trap is zero, the opening operation of the integrated valve is commanded, and the integrated valve is not open, the controller does not perform a hydrogen concentration estimation of the fuel cell stack, and the controller does not perform a zero value correction of a hydrogen pressure sensor configured to detect a pressure of hydrogen supplied to the fuel cell stack.

3. The device of claim 2, wherein, when the water level of the water trap is zero, the opening operation of the integrated valve is commanded, and the integrated valve is open, the controller performs the hydrogen concentration estimation of the fuel cell stack, and the controller performs the zero value correction of the hydrogen pressure sensor after a set time elapses.

4. The device of claim 1, wherein, when a water level of the water trap is not zero, the opening operation of the integrated valve is commanded, the integrated valve is open and, simultaneously, a water level of the water trap is not decreased, the controller determines that a discharge passage of the integrated valve is clogged after a set time elapses.

5. The device of claim 1, wherein, when a closing operation of the integrated valve is commanded and the integrated valve is not closed, the controller does not perform a hydrogen concentration estimation of the fuel cell stack.

6. The device of claim 5, wherein, when the closing operation of the integrated valve is commanded and the integrated valve is closed, the controller performs the hydrogen concentration estimation of the fuel cell stack after a set time elapses.

7. The device of claim 1, wherein, when a closing operation is commanded to the integrated valve and when it is determined that the integrated valve fails and, simultaneously, a pressure of the hydrogen supplied to the fuel cell stack is decreased, the controller interrupts a supply of the hydrogen to the fuel cell stack.

8. The device of claim 1, wherein, when a closing operation is commanded to the integrated valve and when it is determined that the integrated valve fails and, simultaneously, a pressure of the hydrogen supplied to the fuel cell stack is not decreased, the controller limits an output of the fuel cell stack to be less than or equal to a predetermined reference output.

9. The device of claim 1, wherein, when the opening operation is commanded to the integrated valve and when the instantaneous rate of change of the drive current is changed from a positive (+) value to a negative (−) value and then changed from the negative (−) value to the positive (+) value again while the drive current of the integrated valve is increased, the controller determines that the integrated valve is open.

10. The device of claim 1, wherein, when a closing operation is commanded to the integrated valve and when the instantaneous rate of change of the drive current is changed from a negative (−) value to a positive (+) value and then changed from the positive (+) value to the negative (−) value again while the drive current of the integrated valve is decreased, the controller determines that the integrated valve is closed.

11. The device of claim 1, wherein, when the integrated valve is entered into the forced driving mode, the controller commands an operation according to a set open duty cycle and the number of times of opening operations to the integrated valve.

* * * * *